United States Patent
Yabuhara (10) Patent No.: US 9,250,361 B2
(45) Date of Patent: Feb. 2, 2016

(54) ANTIREFLECTION FILM AND POLARIZING PLATE

(71) Applicant: TOPPAN PRINTING CO., LTD., Tokyo (JP)

(72) Inventor: Yasushi Yabuhara, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 99 days.

(21) Appl. No.: 14/036,929

(22) Filed: Sep. 25, 2013

(65) Prior Publication Data

US 2014/0022639 A1 Jan. 23, 2014

Related U.S. Application Data

(63) Continuation of application No. PCT/JP2012/057792, filed on Mar. 26, 2012.

(30) Foreign Application Priority Data

Mar. 29, 2011 (JP) .................................. 2011-072152

(51) Int. Cl.
*G02B 1/11* (2015.01)
*G02B 1/116* (2015.01)
(Continued)

(52) U.S. Cl.
CPC *G02B 1/11* (2013.01); *G02B 1/111* (2013.01); *G02B 1/116* (2013.01); *G02B 5/30* (2013.01)

(58) Field of Classification Search
CPC .......... G02B 1/11; G02B 1/111; G02B 1/116; G02B 1/118; G02B 1/30; G02B 1/14; G02B 1/16; G02B 1/18; G02B 5/0278; G02B 5/0242; G02B 5/0268; G02B 5/0294; G02B 5/30; G02F 1/133502; G02F 2202/22; B05D 3/107; B05D 3/061; B05D 3/10; B29D 11/0073
USPC ............. 359/488.01, 586, 580, 609; 427/162, 427/372.2; 349/112, 137
See application file for complete search history.

(56) References Cited

U.S. PATENT DOCUMENTS

| 6,343,865 B1 * | 2/2002 | Suzuki | 359/601 |
| 2002/0068134 A1 * | 6/2002 | Yagi et al. | 428/1.1 |

(Continued)

FOREIGN PATENT DOCUMENTS

| EP | 2693236 | 2/2014 |
| JP | 7-314619 | 12/1995 |

(Continued)

OTHER PUBLICATIONS

Nair, Rahul. Measuring Hardness and More through Nanoindentation. Archived on May 14, 2014 at http://web.archive.org/web/20140514094852/http://csmres.co.uk/cs.public.upd/article-downloads/Measuring-Hardness-and-More-through-Nanoindentation--Rahul-Nair-(2)-docx.pdf.*

(Continued)

*Primary Examiner* — Zachary Wilkes
*Assistant Examiner* — Collin X Beatty (57) ABSTRACT

An antireflection film is provided which includes stacking in order a transparent base material, a first layer, and a second layer whose refractive index is lower than the refractive index of the first layer. The first layer is formed by curing a coating film containing an ionizing radiation curing material, a quaternary ammonium salt material, and a leveling material.

4 Claims, 2 Drawing Sheets

(51) Int. Cl.
*G02B 1/111* (2015.01)
*G02B 5/30* (2006.01)

(56) References Cited

U.S. PATENT DOCUMENTS

| | | | |
|---|---|---|---|
| 2002/0142133 A1* | 10/2002 | Matsunaga et al. | 428/141 |
| 2004/0114248 A1* | 6/2004 | Hokazono et al. | 359/603 |
| 2006/0123915 A1* | 6/2006 | Arnold et al. | 73/708 |
| 2006/0147723 A1* | 7/2006 | Jing et al. | 428/421 |
| 2007/0066703 A1* | 3/2007 | Shinohara et al. | 522/172 |
| 2007/0206286 A1* | 9/2007 | Fukushige et al. | 359/580 |
| 2007/0207298 A1* | 9/2007 | Suzuki et al. | 428/216 |
| 2008/0239486 A1 | 10/2008 | Kato et al. | |
| 2012/0135210 A1* | 5/2012 | Walker et al. | 428/212 |
| 2012/0164458 A1* | 6/2012 | Biteau et al. | 428/447 |
| 2012/0237673 A1* | 9/2012 | Kuniyasu et al. | 427/162 |
| 2012/0281287 A1* | 11/2012 | Shibayama et al. | 359/585 |

FOREIGN PATENT DOCUMENTS

| | | | | |
|---|---|---|---|---|
| JP | 11-92750 | 4/1999 | | |
| JP | 2003-45234 | 2/2003 | | |
| JP | 3541606 | 7/2004 | | |
| JP | 2005-103922 | 4/2005 | | |
| JP | 2005-144858 | 6/2005 | | |
| JP | 2005-187770 | 7/2005 | | |
| JP | 2008-250315 | 10/2008 | | |
| JP | 2010-243879 | * 10/2010 | | G02B 1/11 |
| TW | 200622288 | 7/2006 | | |
| TW | 201015127 | 4/2010 | | |

OTHER PUBLICATIONS

Taiwanese Office Action mailed Jul. 25, 2014 in corresponding Taiwanese Patent Application No. 101110765.
Korean Office Action mailed Sep. 26, 2014 in corresponding Korean Patent Application No. 10-2013-7025646.
International Search Report mailed Jul. 3, 2012 in corresponding International Application No. PCT/JP2012/057792.
Extended European Search Report dated Aug. 1, 2014 in corresponding European Patent Application No. 12763361.8.
International Preliminary Report on Patentability issued Oct. 10, 2013 in corresponding International Patent Application No. PCT/JP2012/057792.

* cited by examiner

ANTIREFLECTION FILM AND POLARIZING PLATE

CROSS REFERENCE TO RELATED APPLICATIONS

This application is a Continuation Application of PCT Application No. PCT/JP2012/057792, filed Mar. 26, 2012 and based upon and claiming the benefit of priority from prior Japanese Patent Application No. 2011-072152, filed Mar. 29, 2011, the entire contents of all of which are incorporated herein by reference.

BACKGROUND OF THE INVENTION

1. Field of the Invention

The present invention relates to an antireflection film, which has excellent hard coat property, antistatic property, transparency, and scratch resistance and is excellent in alkali resistance; a polarization plate using the antireflection film; and a transmission type liquid crystal display.

2. Description of the Related Art

In general, a display is used under an environment in which natural light or the like enters, regardless of whether used outdoors or indoors. The incident light such as natural light is regularly reflected on a display surface and so on, and a reflected image thus obtained is mixed with a displayed image, whereby a screen display quality is lowered. Thus, it is essential to impart an antireflection function to a display screen and so on, and for the antireflection function, the realization of higher performance and combination with other antireflection functions are required.

In general, the antireflection function is obtained by forming, on a transparent base material, an antireflection layer having a multilayer structure, and more specifically, a repeated structure including high refractive index layers and low refractive index layers which are formed of a transparent material such as metal oxide. Such an antireflection layer having the multilayer structure can be formed by a dry coating method such as a chemical vapor deposition (CVD) method and a physical vapor deposition (PVD) method. As a method for antireflection layer formation, a wet coating method allowing realization of a large area, continuous production, and cost reduction has been proposed.

Such an antireflection layer is sometimes formed on a transparent base material having a relatively soft surface. In this case, in order to impart surface hardness, there has been generally used a method of providing a hard coat layer, constituted of a polymer of an acrylic multifunctional compound, and forming an antireflection layer on the hard coat layer. The hard coat layer has high surface hardness, glossiness, transparency, and scratch resistance according to characteristics of acrylic resin. However, since the hard coat layer has high insulation properties, the hard coat layer is easily chargeable, and there is a problem that a failure occurs due to stains due to adhesion of dust or the like on a surface of a product having the hard coat layer and electrification in a display manufacturing process.

Thus, in an antireflection film having an antireflection layer and a hard coat layer provided on a transparent base material, there have been proposed a method of imparting an antistatic function to the hard coat layer and a method of further providing an antistatic layer between the transparent base material and the hard coat layer or between the antireflection layer and the hard coat layer.

In various image display devices such as a liquid crystal display (LCD), a plasma display panel (PDP), an electroluminescence display (OLED), and a cathode-ray tube (CRT) display device, the antireflection film is installed on a surface of a display to prevent deterioration of contrast due to reflection of natural light and reflection of an image. In particular, in many LCDs, an antireflection film is disposed accompanying realization of a large display screen. In the LCD, a polarization plate is indispensable as an optical material. In general, the polarization plate has a structure in which a polarization layer is protected by two protective films. The antireflection function is imparted to the protective films, making it possible to significantly reduce cost and reduce the thickness of a display device. Meanwhile, when the protective film and a polarization layer are bonded to each other, the protective film is required to have a sufficient adhesiveness to the polarization layer.

The techniques related to the above technique are disclosed in JP-A 11-92750 (KOKAI), JP-A 7-314619 (KOKAI), JP-A 2003-45234 (KOKAI), and JP-A 2005-144858 (KOKAI), for example.

BRIEF SUMMARY OF THE INVENTION

The adhesiveness between a protective film and a polarization layer can be typically improved by applying saponification processing to a surface of the protective film to hydrophilize the surface. The cost of the saponification processing can be reduced by carrying out the saponification processing after formation of an antireflection layer and/or an antiglare layer on the protective film. However, in the saponification processing, the vicinity of the surface of the protective film is hydrolyzed by an alkali solution. Thus, when the surface of the protective film is subjected to the saponification processing after the formation of the antireflection layer, the adhesiveness between the protective film and the antireflection layer formed on the hard coat layer may be deteriorated, or the antireflection performance may be changed.

An object of the present invention is to provide an antireflection film having a high surface hardness, excellent antistatic characteristics, transparency, scratch resistance, and alkali resistance.

The present inventors have found that in an antireflection film having a hard coat layer containing a quaternary ammonium salt material and a low refractive index layer provided on the hard coat layer, the alkali resistance correlates with a micro-indentation hardness of the hard coat layer, and more specifically, the micro-indentation hardness obtained when an indentation depth is 100 nm. The present invention according to the following first and second aspects has been made based on such finding.

The first aspect of the present invention relates to an antireflection film including stacking in order a transparent base material, a first layer, and a second layer whose refractive index is lower than the refractive index of the first layer, wherein the first layer is formed by curing a coating film containing an ionizing radiation curing material, a quaternary ammonium salt material, and a leveling material.

The leveling material may be a fluorine-based leveling material.

An amount of the leveling material may be within a range of 0.05 to 5.0 parts by mass based on 100 parts by mass of a total of the ionizing radiation curing material, the quaternary ammonium salt material, and the leveling material.

For a surface of the first layer before formation of the second layer, a micro-indentation hardness obtained when an indentation depth is 100 nm may be within a range of 0.45 GPa to 1.0 GPa.

The antireflection film may satisfy at least one of requirements: (1) a center line average roughness Ra of a surface of the first layer is within a range of 0.001 µm to 0.010 µm and (2) an average interval Sm of concaves and convexes of the hard coat layer surface is within a range of 0.15 mm to 1.00 mm.

The second aspect of the present invention relates to a method of manufacturing an antireflection film including stacking in order a transparent base material, a first layer, and a second layer whose refractive index is lower than the refractive index of the first layer, the method including:

coating a coating liquid containing an ionizing radiation curing material, a quaternary ammonium salt material, and a leveling material onto at least one principal surface of the transparent base material to form a first coating film; and irradiating the first coating film with an ionizing radiation to obtain the first layer as a cured product of the first coating film.

In the manufacturing method, the first coating film may be irradiated with the ionizing radiation under an atmosphere having an oxygen concentration of not more than 1 vol %.

The ionizing radiation may be ultraviolet rays.

The third aspect of the present invention relates to a polarization plate including:

the antireflection film aforementioned;

a polarization layer facing the first layer of the antireflection film while holding the transparent base material of the antireflection film between the polarization layer and the first layer; and a transparent base material facing the antireflection film while holding the polarization layer between the transparent base material and the antireflection film.

DETAILED DESCRIPTION OF THE INVENTION

<<Antireflection Film>>

An antireflection film according to one aspect of the present invention will be described with reference to the drawings.

Figure 1:
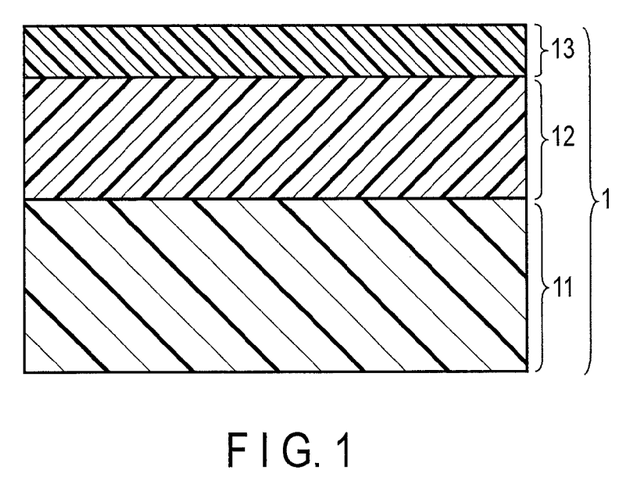
FIG. 1 is a cross-sectional schematic view of an antireflection film according to one embodiment.

FIG. 1 is a cross-sectional schematic view of the antireflection film according to one aspect.

An antireflection film 1 according to this embodiment is provided with a transparent base material 11, a hard coat layer 12, and a low refractive index layer 13, as shown in FIG. 1. The hard coat layer 12 and the low refractive index layer 13 are installed on at least one principal surface of the transparent base material 11. The hard coat layer 12 and the low refractive index layer 13 are stacked in this order from the transparent base material 11 side. The refractive index of the low refractive index layer 13 is lower than the refractive index of the hard coat layer 12. The refractive index of the low refractive index layer 13 is lower by, for example, 0.05 to 0.30 than the refractive index of the hard coat layer 12. The refractive index is, for example, a refractive index measured at a wavelength of 589 nm.

Hereinafter, the hard coat layer 12 and the low refractive index layer 13 will be described.

<Hard Coat Layer>

The hard coat layer 12 is produced from an ionizing radiation curing material and a quaternary ammonium salt material.

For example, a hard coat layer forming coating liquid containing those materials is irradiated with an ionizing radiation to be cured, and, thus, to produce the hard coat layer 12. More specifically, for example, the coating liquid is applied onto at least one principal surface of a transparent base material, and an ionizing radiation curing material contained in the coating liquid is cured by the ionizing radiation, whereby the hard coat layer 12 is formed.

In the hard coat layer, the quaternary ammonium salt material imparts electroconductivity to an antireflection film, and the antireflection film having antistatic properties can be obtained.

The film thickness of the hard coat layer 12 is preferably within a range of 5 µm to 10 µm. When the film thickness of the hard coat layer is 3 µm or more, a sufficient strength can be obtained; however, the film thickness of the hard coat layer is preferably within a range of 5 µm to 10 µm in terms of coating accuracy and handleability. When the film thickness is more than 10 µm, warpage, distortion, and/or bending of a base material due to curing shrinkage may occur. The film thickness of the hard coat layer 12 is more preferably within a range of 5 µm to 7 µm.

<Low Refractive Index Layer>

As shown in FIG. 1, the low refractive index layer 13 is provided on the hard coat layer 12.

No layer is interposed between the low refractive index layer 13 and the hard coat layer 12. Namely, the low refractive index layer 13 is provided directly on the hard coat layer 12.

The low refractive index layer 13 is produced from an ionizing radiation curing material and low refractive index particles. For example, a low refractive index layer forming coating liquid containing those materials is irradiated with an ionizing radiation to be cured, and, thus, to produce the low refractive index layer 13. More specifically, for example, the coating liquid is applied onto the hard coat layer, and an ionizing radiation curing material is cured by the ionizing radiation, whereby the low refractive index layer 13 is formed.

A film thickness (d) of the low refractive index layer 13 is designed so that an optical film thickness (nd) obtained by multiplying the film thickness (d) by the refractive index (n) of the low refractive index layer is equal to ¼ of a wavelength of visible light. The film thickness (d) of the low refractive index layer 13 is within a range of 50 nm to 150 nm, for example.

The antireflection film 1 may further include a functional layer (not shown). When the antireflection film 1 includes the functional layer, the functional layer is provided between the transparent base material 11 and the hard coat layer 12. The functional layer is, for example, an electromagnetic shielding layer having an electromagnetic shielding performance, an infrared absorbing layer having an infrared absorbing performance, an ultraviolet absorbing layer having an ultraviolet absorbing performance, or a color correction layer having a color correction performance.

In the antireflection film, for the hard coat layer surface of the hard coat layer 12 before the formation of the low refractive index layer, the micro-indentation hardness obtained when the indentation depth is 100 nm is within a range of 0.45 GPa to 1.0 GPa. When the micro-indentation hardness is within such a range, the antireflection film can have a sufficient alkali resistance. If the antireflection film is to have a sufficient alkali resistance, for the hard coat layer surface of the hard coat layer before the formation of the low refractive index layer, the micro-indentation hardness obtained when the indentation depth is 100 nm may be 0.45 GPa or more. However, for the surface, when the micro-indentation hardness obtained when the indentation depth is 100 nm is more than 1.0 GPa, the flexibility of the hard coat layer surface is lost, so that a crack is easily generated when a film is bent. Accordingly, according to the antireflection film of this aspect, for the hard coat layer surface before the formation of the low refractive index layer, the micro-indentation hardness obtained when the indentation depth is 100 nm is within a range of 0.45 GPa to 1.0 GPa.

When the micro-indentation hardness is less than 0.45 GPa, the antireflection film does not have a sufficient alkali resistance, and when the antireflection film is immersed in an alkaline solution, film-peeling of the low refractive index layer 13 occurs. Meanwhile, the scratch resistance is lowered due to insufficient hardness near the hard coat layer surface.

For the surface of the hard coat layer 12 of the antireflection film, the micro-indentation hardness obtained when the indentation depth is 100 nm can be obtained using an ultra-micro indentation hardness testing machine.

The hard coat layer 12 whose micro-indentation hardness is 0.45 GPa or more is obtained by, for example, irradiating an ionizing radiation curing material with ultraviolet rays under an atmosphere having an oxygen concentration of 1 vol % or less and thereby curing the ionizing radiation curing material. The atmosphere having an oxygen concentration of 1 vol % or less can be achieved by purging an ultraviolet irradiated portion with an inert gas such as nitrogen.

In the antireflection film, it is preferable to satisfy at least one of a center line average roughness Ra of the hard coat layer surface being within a range of 0.001 μm to 0.010 μm and an average interval Sm of concaves and convexes of the hard coat layer surface being within a range of 0.15 mm to 1.00 mm. In the antireflection film 1 of this aspect, it is preferable that before the formation of the low refractive index layer, the surface of the hard coat layer does not have minute concaves and convexes and is as smooth as possible.

When the surface of the hard coat layer is smoothed, the antireflection film can have a sufficient alkali resistance. The smaller a center line average roughness (Ra) of the hard coat layer, the smoother the hard coat layer. Even if there are minute concaves and convexes, when the average interval (Sm) of the concaves and convexes is large, the hard coat layer is smooth. When the center line average roughness (Ra) is more than 0.010 μm, the hard coat layer surface has minute concaves and convexes, and the antireflection film may not have a sufficient alkali resistance. However, even if the center line average roughness (Ra) is more than 0.10 μm, when the average interval (Sm) of the concaves and convexes is 0.15 mm or more, the hard coat layer can be smoothed. When the center line average roughness (Ra) is more than 0.010 μm and when the average interval (Sm) of the concaves and convexes is less than 0.15 mm, the hard coat layer surface has minute concaves and convexes, and the antireflection film may not have a sufficient alkali resistance.

It is difficult to form a hard coat layer whose center line average roughness (Ra) is less than 0.001 μm, and similarly, it is difficult to form a hard coat layer in which the average interval (Sm) of the concaves and convexes is more than 1.00 mm. In the antireflection film, it is preferable that the center line average roughness Ra of the hard coat layer surface is within a range of 0.001 μm to 0.010 μm, or that the average interval Sm of the concaves and convexes of the hard coat layer surface is within a range of 0.15 mm to 1.00 mm.

In order to form a hard coat layer without minute irregularities in which the center line average roughness Ra of the hard coat layer surface is within a range of 0.001 μm to 0.010 μm or in which the average interval Sm of the convexes and concaves of the hard coat layer surface is within a range of 0.15 mm to 1.00 mm, it is preferable that a fluorine-based leveling agent is added in an amount of 0.05 to 5.0 parts by mass based on 100 parts by mass of a hard coat layer forming material. An acrylic resin or the like is coated onto the transparent base material 11, and when the coating is cured, a diluting solvent of the acrylic resin is required to be volatilized; however, at this time, air near a resin surface is cooled by vaporization heat, and moisture content in the air is condensed. The moisture content is taken into the resin surface, and when the ionizing radiation curing material is cured, minute irregularities are formed on the hard coat layer surface. When the fluorine-based leveling agent is contained in an amount of less than 0.05 parts by mass based on 100 parts by mass of the hard coat layer forming material, the hard coat layer surface has a poor leveling property, and the minute irregularities on the surface sometimes cannot be smoothed. Meanwhile, when the fluorine-based leveling agent is contained in an amount of more than 5.0 parts by mass based on 100 parts by mass of the hard coat layer forming material, in the coating with the hard coat layer forming coating liquid, cissing occurs between the hard coat layer forming coating liquid and the transparent base material 11.

The hard coat layer forming material in this specification is a hard coat layer forming coating liquid from which the solvent is removed and indicates a solid content of the hard coat layer forming coating liquid.

<<Process for Producing Antireflection Film>>

The antireflection film according to this aspect is produced as follows, for example.

<Formation of Hard Coat Layer>

First, a transparent base material is provided.

As the transparent base material to be used, a cellulose-based film such as a triacetyl cellulose film can be preferably used. The cellulose-based film such as a triacetyl cellulose film is less likely to cause birefringence, is excellent in optical characteristics such as transparency, refractive index, and dispersion and physical properties such as impact resistance, heat resistance, and durability, and can be suitably used for a liquid crystal display. Moreover, the cellulose-based film can be suitably used. Since the cellulose-based film can be easily dissolved or swollen by a solvent when the hard coat layer forming coating liquid is coated onto the transparent base material, occurrence of interference unevenness caused by the film thickness of the hard coat layer formed when the hard coat layer is formed on the transparent base material can be effectively prevented, as described later.

The transparent base material may contain various stabilizers, ultraviolet absorbers, plasticizers, lubricants, colorants, antioxidants, flame retardants, and so on.

Although the thickness of the transparent base material is not limited particularly, the thickness is preferably within a range of 20 μm to 200 μm. When a triacetyl cellulose film is used as the transparent base material, the thickness of the transparent base material is preferably within a range of 40 μm to 80 μm.

[Coating Step]

Next, the hard coat layer forming coating liquid is coated onto one principal surface of the transparent base material. For example, the hard coat layer forming coating liquid is coated onto the principal surface of the transparent base material by a wet film forming method.

The wet film forming method includes, for example, a dip coating method, a spin coating method, a flow coating method, a spray coating method, a roll coating method, a gravure roll coating method, an air doctor coating method, a blade coating method, a wire doctor coating method, a knife coating method, a reverse coating method, a transfer roll coating method, a micro gravure coating method, a kiss coating method, a cast coating method, a slot orifice coating method, a calendar coating method, and a die coating method. Since the hard coat layer 12 is specifically required to be formed to be thin and uniform, the micro gravure coating method is preferably used as the wet film forming method. When a thick layer is required to be formed, the die coating method can be used as the wet film forming method.

A coating film is coated so that the film thickness of the hard coat layer is 3 µm or more, for example. When the film thickness is 3 µm or more, a sufficient strength is obtained. It is preferable in terms of coating accuracy and handleability that the coating film is coated so that the film thickness of the hard coat layer is within a range of 5 µm to 10 µm. When the coating film is coated so that the film thickness of the hard coat layer is more than 10 µm, warpage, distortion, and bending of a base material due to curing shrinkage may occur. It is very preferable that the coating film is coated so that the film thickness of the hard coat layer is within a range of 5 µm to 7 µm.

The hard coat layer forming coating liquid contains an ionizing radiation curing material and a quaternary ammonium salt material.
(Ionizing Radiation Curing Material)

As an ionizing radiation curing material, an acrylic-based material can be used. The acrylic-based material includes, for example, a monofunctional or polyfunctional (meth)acrylate compound such as acrylic acid ester and methacrylic acid ester of polyhydric alcohol and a polyfunctional urethane (meth)acrylate compound synthesized from diisocyanate, polyhydric alcohol, hydroxy ester of acrylic acid or methacrylic acid, and so on. Other acrylic-based materials include, for example, polyether resin, polyester resin, epoxy resin, alkyd resin, spiroacetal resin, polybutadiene resin, and polythiol-polyene resin having an acrylate-based functional group.

In this specification, "(meth)acrylate" is both "acrylate" and "methacrylate". For example, "urethane (meth)acrylate" is both "urethane acrylate" and "urethane methacrylate".

The monofunctional (meth)acrylate compound includes, for example, 2-hydroxyethyl (meth)acrylate, 2-hydroxypropyl (meth)acrylate, 2-hydroxybutyl (meth) acrylate, n-butyl (meth)acrylate, isobuty (meth) acrylate, t-butyl (meth)acrylate, glycidyl (meth) acrylate, acryloyl morpholine, N-vinyl pyrrolidone, tetrahydrofurfuryl acrylate, cyclohexyl (meth) acrylate, 2-ethylhexyl (meth)acrylate, isobornyl (meth)acrylate, isodecyl (meth)acrylate, lauryl (meth)acrylate, tridecyl (meth)acrylate, cetyl (meth) acrylate, stearyl (meth)acrylate, benzyl (meth) acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy(meth)acrylate, propylene oxide-modified phenoxy (meth)acrylate, nonylphenol (meth) acrylate, ethylene oxide-modified nonylphenol (meth)acrylate, propylene oxide-modified nonylphenol (meth)acrylate, methoxydiethylene glycol (meth)acrylate, methoxypolyethylene glycol (meth)acrylate, methoxypropylene glycol (meth)acrylate, 2-(meth) acryloyloxyethyl-2-hydroxypropylphthalate, 2-hydroxy-3-phenoxypropyl (meth)acrylate, 2-(meth) acryloyloxyethylhydrogen phthalate, 2-(meth) acryloyloxypropylhydrogen phthalate, 2-(meth) acryloyloxypropylhexahydrohydrogen phthalate, 2-(meth) acryloyloxypropyltetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, octafluoropropyl (meth)acrylate, and adamantane derivative mono (meth)acrylate such as adamantyl acrylate having monovalent mono (meth) acrylate derived from 2-adamantane and adamantanediol.

Difunctional (meth)acrylate compounds include, for example, di(meth)acrylates such as ethylene glycol di(meth)acrylate, diethylene glycol di(meth)acrylate, butane diol di(meth)acrylate, hexanediol di(meth) acrylate, nonandiol di(meth)acrylate, ethoxylated hexanediol di(meth)acrylate, propoxydized hexanediol di(meth)acrylate, diethylene glycol di(meth)acrylate, polyethylene glycol di(meth)acrylate, tripropylene glycol di(meth)acrylate, polypropylene glycol di(meth) acrylate, neopentyl glycol di(meth)acrylate, ethoxylated neopentyl glycol di(meth)acrylate, tripropylene glycol di(meth)acrylate, and hydroxypyvalic acid neopentyl glycol di(meth)acrylate.

(Meth) acrylate compounds having three or more functionalities include, for example, trifunctional (meth)acrylate compounds such as tri(meth)acrylate such as trimethylolpropane tri(meth)acrylate, ethoxylated trimethylolpropane tri (meth)acrylate, propoxydized trimethylolpropane tri(meth) acrylate, tris 2-hydroxyethyl isocyanurate tri(meth)acrylate, and glycerin tri(meth)acrylate, pentaerythritol tri(meth)acrylate, dipentaerythritol tri(meth) acrylate, and ditrimethylolpropane tri(meth)acrylate, multifunctional (meth)acrylate compounds having three or more functionalities such as pentaerythritol tetra(meth)acrylate, ditrimethylolpropane tetra (meth) acrylate, dipentaerythritol tetra(meth)acrylate, dipentaerythritol penta(meth)acrylate, ditrimethylolpropane penta (meth)acrylate, dipentaerythritol hexa(meth)acrylate, and ditrimethylolpropane hexa(meth)acrylate, and multifunctional (meth)acrylate compounds in which some of the (meth) acrylates are substituted with an alkyl group or ε-caprolactone.

Among the acrylic-based materials, the polyfunctional urethane acrylate can be suitably used because desired molecular weight and molecular structure can be designed, and, at the same time, the physicality of the hard coat layer to be formed can be easily balanced. Urethane acrylate can be obtained by reacting polyhydric alcohol, polyhydric isocyanate, and hydroxy acrylate.
(Quaternary ammonium salt material)

As a quaternary ammonium salt material, a structure of $N^+X^-$ is shown, and the electroconductivity of the hard coat layer is expressed by provision of a quaternary nitrogen atom ($-N^+$) and anion ($X^-$). At this time, $X^-$ includes $Cl^-$, $Br^-$, $I^-$, $F^-$, $HSO_4^-$, $SO_4^{2-}$, $NO_3^-$, $PO_4^{3-}$, $HPO_4^{2-}$, $H_2PO_4^-$, $SO_3^-$, and $OH^-$.

Particularly, as the quaternary ammonium salt material, an acrylic-based material containing in the molecule a quaternary ammonium cation as a functional group can be suitably used. The acrylic-based material containing in the molecule the quaternary ammonium cation as the functional group includes, for example, a monofunctional or polyfunctional (meth)acrylate compound such as an acrylic acid ester and methacrylic acid ester of polyhydric alcohol containing in the molecule the quaternary ammonium cation as the functional group or a polyfunctional urethane (meth) acrylate compound synthesized from diisocyanate, polyhydric alcohol, hydroxy ester of acrylic acid or methacrylic acid, and so on. Other ionizing radiation curing materials include, for example, polyether resin, polyester resin, epoxy resin, alkyd resin, spiroacetal resin, polybutadiene resin, and polythiol-polyene resin having an acrylate-based functional group.

Particularly, as a specific example of the acrylic-based material containing in the molecule the quaternary ammonium cation as the functional group, Light Ester DQ-100 (produced by Kyoei Chemical Co., Ltd.) and so on may be used. By virtue of the use of the acrylic-based material containing in the molecule the quaternary ammonium cation as the functional group, the low refractive index layer can be stably formed on the hard coat layer. When the hard coat layer is formed using a material, which has the quaternary ammonium cation and no acrylic group and/or methacrylic group, and an acrylic-based material having no quaternary ammonium cation, the material containing the quaternary ammonium cation is segregated to a surface, whereby when a low refractive index layer forming coating liquid is coated onto the hard coat layer, the low refractive index layer forming coating liquid may be repelled. Moreover, a low refractive index layer to be formed may be whitened. The acrylic-based material containing the quaternary ammonium cation in the molecule forms a matrix and can prevent surface segregation.

The hard coat layer is formed using a quaternary ammonium salt material, whereby an antistatic function can be imparted to the hard coat layer. When the hard coat layer is formed using the quaternary ammonium salt material among electroconductive materials, a total light transmittance can be prevented from being lowered, and, in addition, occurrence of interference unevenness can be suppressed in comparison with a case where the hard coat layer having antistatic properties is formed using only the electroconductive material such as metal particles and metal oxide particles.

The more notably the interference unevenness of the antireflection film occurs, the larger a refractive index difference between the transparent base material and the hard coat layer. When the hard coat layer is formed using only the electroconductive particles such as metal particles and metal oxide particles, reduction of the scratch resistance of an antireflection layer surface and reduction of an adhesiveness between the hard coat layer and the transparent base material are confirmed. However, by virtue of the use of the quaternary ammonium cation, in comparison with the case where the head coat layer is formed using only the electroconductive particles such as metal particles and metal oxide particles, the refractive index of the hard coat layer can be prevented from being increased, and an antireflection film free from the interference unevenness can be obtained.

The acrylic-based material containing in the molecule the quaternary ammonium cation as the functional group corresponds to both the ionizing radiation curing material and the quaternary ammonium salt material. When the acrylic-based material containing in the molecule the quaternary ammonium cation as the functional group is used, the ionizing radiation curing material having no quaternary ammonium cation is added to a coating liquid if necessary.

The hard coat layer forming coating liquid may contain a leveling agent. A fluorine-based leveling agent is preferably used as the leveling agent. As the fluorine-based leveling agent, a compound having a perfluoroalkyl group or a fluorinated alkenyl group in a main or side chain can be used, for example. The perfluoroalkyl group has a structure of $C_nF_{2n+1}$ (n=natural number) and functions as a hydrophobic/oleophobic group. Thus, since the perfluoroalkyl group has a feature of orderly arrangement on a surface, the perfluoroalkyl group functions as a leveling material covering a surface in small amounts. By virtue of the combination of the perfluoroalkyl group with the oleophilic group, the effect as the leveling material can be further increased. As the fluorine-based leveling agent, BYK-340 manufactured by BYK Japan KK, FETERGENT 222F manufactured by Neos Company Limited, F470 manufactured by DIC Corporation, V-8FM manufactured by Osaka Organic Chemical Industry Ltd. and the like can be used; however, the fluorine-based leveling agent is not limited to them.

The content of the fluorine-based leveling agent is preferably within a range of 0.05 to 5.0 parts by mass based on 100 parts by mass of the hard coat layer forming material. When the content of the fluorine-based leveling agent is within this range, it is possible to obtain an antireflection film in which the center line average roughness Ra of the hard coat layer is within a range of 0.001 μm to 0.010 μm, or the average interval Sm of the concaves and convexes of the hard coat layer surface is within a range of 0.15 mm to not more than 1.00 mm.

The hard coat layer forming coating liquid may further contain a solvent. The solvent is preferably a solvent which dissolves or swells a transparent base material surface. When the hard coat layer is formed using a coating liquid containing the solvent which dissolves or swells the transparent base material surface, the adhesiveness between the transparent base material 11 and the hard coat layer 12 can be enhanced. The hard coat layer in which a transparent base material component and a hard coat layer component are mixed can be formed, and the occurrence of the interference unevenness of a hard coat film to be obtained can be prevented.

When a cellulose-based film is used as the transparent substrate, a solvent which dissolves or swells a surface of the cellulose-based film includes, for example, ethers such as dibutyl ether, dimethoxymethane, diethoxyethane, propylene oxide, 1,4-dioxane, 1,3-dioxolane, 1,3,5-trioxane, tetrahydrofuran, anisole, and phenetol; ketones such as acetone, methyl ethyl ketone, diethyl ketone, dipropyl ketone, diisobutyl ketone, cyclopentanone, cyclohexanone, methylcyclohexanone, and methylcyclohexanone; esters such as ethyl formate, propyl formate, n-pentyl formate, methyl acetate, ethyl acetate, methyl propionate, ethyl propionate, n-pentyl acetate, and γ-butyrolactone; and cellosolves such as methyl cellosolve, cellosolve, butyl cellosolve, and cellosolve acetate. They may be used alone or in any combination of two or more kinds of them. It is preferable to use at least one of methyl acetate, ethyl acetate, methyl ethyl ketone, acetylacetone, acetone, and cyclohexanone.

When a coating film obtained by coating of the hard coat layer forming coating film is cured with ultraviolet rays as the ionizing radiation to form the hard coat layer, a photoinitiator is added to the coating liquid. In this case, it is preferable that the photoinitiator is added in an amount of 0.5 to 10.0 parts by mass based on 100 parts by mass of the solid content of the hard coat layer forming coating liquid. When the amount of the photoinitiator is less than 0.5 parts by mass based on 100 parts by mass of the hard coat layer forming material, when the ionizing radiation curing material is cured with ultraviolet rays, the polymerization reaction is insufficient, and a resin is not cured, so that the hardness of the hard coat layer is reduced. When the amount of the photoinitiator is more than 10.0 parts by mass based on 100 parts by mass of the hard coat layer forming material, the degree of polymerization of a resin is lowered after photopolymerization, so that the hard coat layer becomes brittle, which reduces the scratch resistance of the surface.

The photoinitiator includes, for example, 2,2-ethoxyacetophenone, 1-hydroxy cyclohexylphenyl ketone, dibenzoyl, benzoin, benzoinmethyl ether, benzomethyl ether, p-chlorobenzophenone, p-methoxybenzophenone, Michler's ketone, acetophenone, and 2-chlorothioxanetone. They may be used alone or in any combination of two or more kinds of them.

A photosensitizer may be used with the photoinitiator. The photosensitizer includes tertiary amines such as triethylamine, triethanolamine, and 2-dimethylaminoethanol; alkylphosphines such as triphenylphosphine; and thioethers such as β-thiodiglycol. One of those photosensitizers or a mixture of two or more of them may be used.

For further improvement of the performance, the hard coat layer forming coating liquid may contain an antifoaming agent, an antioxidant, an ultraviolet absorber, a light stabilizer, a polymerization inhibitor, and so on.

[Drying Step]

Next, the coating film formed on the transparent substrate is dried.

A method of drying the coating film includes air-blast drying, hot air drying, and heated-air drying and a combination of them.

[Radiation Irradiation Step]

Subsequently, the dried coating film is irradiated with the ionizing radiation to obtain the hard coat layer.

As the ionizing radiation, ultraviolet rays and an electron beam can be used, for example. When the ultraviolet rays are used, a high-pressure mercury lamp, a halogen lamp, a xenon lamp, a fusion lamp, and so on may be used. When the ultraviolet rays are irradiated as the ionizing radiation, the ultraviolet ray irradiation amount is preferably within a range of 100 mJ/cm$^2$ to 800 mJ/cm$^2$.

In this step, the ultraviolet rays are used as the ionizing radiation, and it is preferable that the ultraviolet ray irradiation is performed in an atmosphere having an oxygen concentration of 1 vol % or less. When the hard coat layer is cured in the atmosphere having an oxygen concentration of 1 vol % or less, the adhesiveness between the hard coat layer and the low refractive index layer stacked on the hard coat layer can be improved. Preferred is that the cross-linking reaction or the polymerization reaction of an ionizing radiation-curable resin composition is occurred in the atmosphere having an oxygen concentration of 0.1 vol % or less. The atmosphere having an oxygen concentration of 1 vol % or less is preferably achieved by replacing the atmosphere (the nitrogen concentration is about 80 vol % and the oxygen concentration is about 20 vol %) with another gas and particularly preferably, the atmosphere is achieved by replacing the atmosphere with an inert gas such as a nitrogen gas (by for example, a nitrogen purge).

The hard coat layer is formed as above.

A functional layer may be provided between the hard coat layer and a film of the transparent base material. The functional layer is, for example, an electromagnetic shielding layer having an electromagnetic shielding performance, an infrared absorbing layer having an infrared absorbing performance, an ultraviolet absorbing layer having an ultraviolet absorbing performance, or a color correction layer having a color correction performance.

<Formation of Low Refractive Index Layer>

Next, the low refractive index layer is formed on the hard coat layer.

The refractive index layer is generally formed by a wet film forming method or a dry film forming method. In the wet film forming method, the low refractive index layer forming coating liquid is coated onto the hard coat layer surface to form the antireflection layer. In the dry film forming method, the antireflection layer is formed in a vacuum. The dry film forming method is a vacuum deposition method, a sputtering method, or a CVD method, for example.

In this aspect, the antireflection film can be manufactured at low cost by using the wet film forming method using the low refractive index forming coating liquid containing the ionizing radiation curing material and the low refractive index particles.

Hereinafter, a case of forming the low refractive index layer with the use of the wet film forming method will be described.

[Coating Step]

The low refractive index layer is obtained from the low refractive index layer forming coating liquid. More specifically, the low refractive index layer forming coating liquid is coated onto the hard coat layer surface by the wet film forming method to form a coating film. As the wet film forming method, the wet film forming method exemplified when the hard coat layer forming coating liquid is coated can be used. The low refractive index layer forming coating liquid contains the ionizing radiation curing material and the low refractive index particles.

The low refractive index layer forming coating liquid is coated so that the film thickness (nd) obtained by multiplying the film thickness (d) of the low refractive index layer by the refractive index (n) of the low refractive index layer is equal to ¼ of the wavelength of the visible light.

(Ionizing Radiation Curing Material)

As the ionizing radiation curing material, the acrylic-based material exemplified as the ionizing radiation curing material contained in the hard coat layer forming coating liquid can be used.

(Low Refractive Index Particles)

As the low refractive index particles, the low refractive index particles formed of a low refractive material such as LiF, MgF, 3NaF.AlF or AlF (all of them have a refractive index of 1.4), and $Na_3AlF_6$ (cryolite, refractive index is 1.33) can be used. Moreover, particles having a void in the inside can be suitably used. In the particles having a void in the inside, the void portion may have a refractive index of air ($\approx 1$). Thus, the low refractive index particle having a very low refractive index can be provided. More specifically, a porous silica particle and a low refractive index silica particle having a void in the inside can be used.

The particle diameter of the low refractive index particle is preferably within a range of 1 nm to 100 nm. When the particle diameter is more than 100 nm, there is a tendency that light is significantly reflected by Rayleigh scattering, and the low refractive index layer is whitened to reduce the transparency of the antireflection film. Meanwhile, when the particle diameter is less than 1 nm, there occurs a problem such as nonuniformity of the particles in the low refractive index layer due to aggregation of the particles.

The low refractive index layer forming coating liquid may contain a solvent and various additives if necessary.

The solvent is suitably selected in consideration of coating aptitude from among aromatic hydrocarbons such as toluene, xylene, cyclohexane, and cyclohexylbenzene; hydrocarbons such as n-hexane; ethers such as dibutyl ether, dimethoxymethane, dimethoxyethane, diethoxyethane, propylene oxide, dioxane, dioxolane, trioxane, tetrahydrofuran, anisole and phenetole; ketones such as methyl isobutyl ketone, methyl butyl ketone, acetone, methyl ethyl ketone, diethyl ketone, dipropyl ketone, diisobutyl ketone, cyclopentanone, cyclohexanone, methylcyclohexanone and methylcyclohexanone; esters such as ethyl formate, propyl formate, n-pentyl formate, methyl acetate, ethyl acetate, methyl propionate, ethyl propionate, n-pentyl acetate and γ-butyrolactone; cellosolves such as methyl cellosolve, cellosolve, butyl cellosolve and cellosolve acetate; alcohols such as methanol, ethanol, and isopropyl alcohol; and water. The coating liquid may contain, as an additive, a surface conditioner, a leveling agent, a refractive index adjusting agent, an adhesion improver, a photosensitizer, or the like.

When the ionizing radiation curing material is used as a binder matrix to be irradiated with ultraviolet rays, and, thus, to form the low refractive index layer, a photoinitiator is added to a coating liquid. As the photoinitiator, the photoinitiator exemplified as the photoinitiator contained in the hard coat layer forming coating liquid can be used.

[Drying Step]

The prepared low refractive index layer forming coating liquid is coated onto the hard coat layer to form a coating film, and the coating film is dried if necessary. As the drying method, a method similar to that described in the section of the formation of the hard coat layer can be used.

[Radiation Irradiation Step]

The coating film is then irradiated with the ionizing radiation to obtain the low refractive index layer. The curing reaction of the ionizing radiation curing material is occurred by irradiation with the ionizing radiation to form a binder matrix, and, thus, to obtain the low refractive index layer.

As the ionizing radiation, ultraviolet rays and electron beams are used, for example.

The antireflection film is obtained as described above.

<<Polarization Plate>>

Next, a polarization plate will be described.

Figure 2:
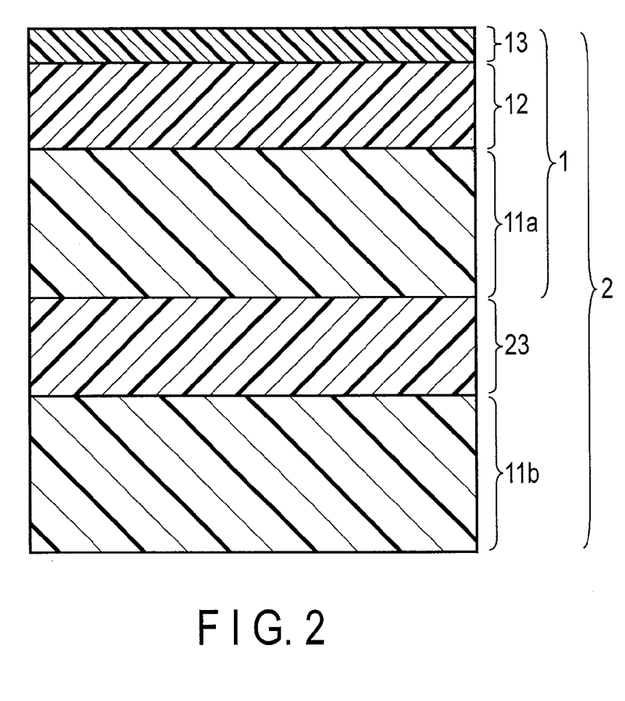
FIG. 2 is a cross-sectional schematic view of a polarization plate provided with the antireflection film according to one embodiment.

FIG. 2 is a cross-sectional schematic view of the polarization plate according to the present aspect.

A polarization plate 2 includes the antireflection film 1. The antireflection film 1 includes a substrate 11a, the hard coat layer 12, and the low refractive index layer 13.

The polarization plate 2 further includes a base material 11b. Namely, the polarization plate 2 includes the two transparent base materials 11a and 11b, a polarization layer 23, and the substrate 11. In the polarization plate 2, the polarization layer 23 is interposed between the transparent base materials 11a and 11b.

In the polarization plate 2, the polarization layer 23 and the transparent base material 11b are provided on a surface opposite to a surface provided with the low refractive index layer 13 of the transparent base material 11a. The polarization layer 23 and the second transparent base material 11b are stacked on the transparent base material 11b in this order. Namely, in the polarization plate 2, the two transparent base materials 11a and 11b hold the polarization layer 23 in between.

As the polarization layer 23, stretched polyvinyl alcohol (PVA) film added with iodine can be used, for example.

As the transparent base material 11b, one similar to that described in the section of the antireflection film can be used. As the transparent base material 11b, a film made of triacetylcellulose can be suitably used.

The antireflection film 1 and the transparent base material 11b are subjected to saponification processing before being bonded to the polarization layer 23. The saponification processing is performed by immersing the antireflection film 1 and the transparent base material 11b in an alkaline solution. The alkaline solution includes a sodium hydroxide aqueous solution and a potassium hydroxide aqueous solution, for example.

The antireflection film 1 has alkali resistance as described above, and the antireflection performance is not changed even if the antireflection film 1 is subjected to the saponification processing. Namely, the antireflection film 1 has excellent saponification resistance. Although in an antireflection film having no saponification resistance, a protective film is required to be provided on a low refractive index layer before the saponification processing, the protective film is not required in this aspect. Thus, an antireflection film and a polarization plate can be provided at low cost.

<<Transmission Type Liquid Crystal Display>>

Next, a transmission type liquid crystal display will be described.

Figure 3:
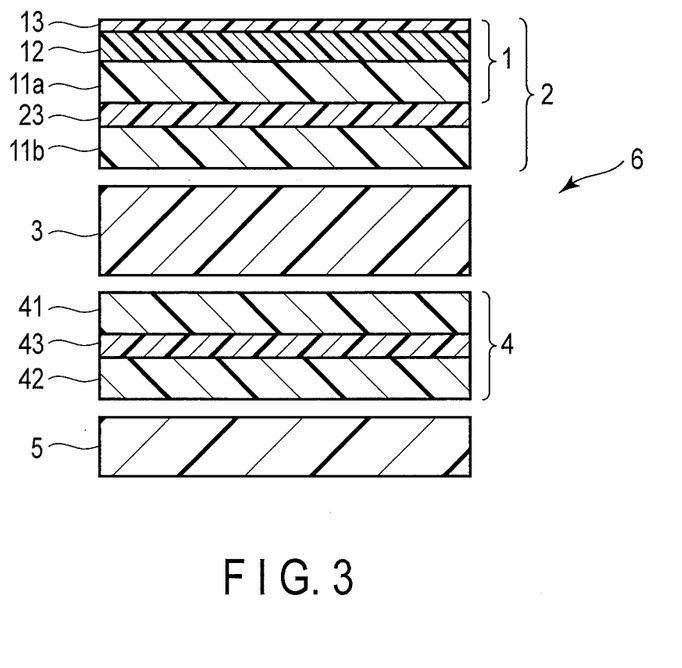
FIG. 3 is a cross-sectional schematic view of a transmission type liquid crystal display provided with the polarization plate according to one embodiment.

FIG. 3 is a cross-sectional schematic view of a transmission type liquid crystal display 6.

As shown in FIG. 3, in the transmission type liquid crystal display 6, the antireflection film 1 is provided on an outermost surface of the transmission type liquid crystal display 6. In such a state that the transmission type liquid crystal display 6 is used, the outermost surface of the transmission type liquid crystal display 6 is disposed on a front surface, that is, on an observer side.

The transmission type liquid crystal display 6 includes the polarization plate 2. The polarization plate 2 is provided with the antireflection film 1, the polarization layer 23, and the transparent base material 11b. The polarization layer 23 faces the hard coat layer 12 while holding the transparent base material 11a between the polarization layer 23 and the hard coat layer 12. The transparent base materials 11a and 11b hold the polarization layer 23 in between.

The transmission type liquid crystal display 6 further includes a polarization plate 4. The polarization plate 4 includes two transparent base materials 41 and 42 and a polarization layer 23. In the polarization plate 4, the transparent base materials 41 and 42 hold the polarization layer 23 in between.

The transmission type liquid crystal display 6 further includes a liquid crystal cell 3. The liquid crystal cell 3 is installed between the polarization plates 2 and 4. In the liquid crystal cell 3, one transparent base material is a TFT substrate provided with a plurality of pixel circuits each including a pixel electrode and a thin film transistor (TFT), and the other transparent base material is a color filter substrate provided with opposed electrodes and a color filter. A liquid crystal material is encapsulated in between the both substrates.

The transmission type liquid crystal display 6 further includes a back light unit 5. The back light unit 5 is provided with a light source and a light diffusion plate. The back light unit 5 faces the liquid crystal cell 3 while holding the polarization plate 4 between the back light unit 5 and the liquid crystal cell 3.

The transmission type liquid crystal display 6 may be further provided with other functional members. The other functional members include, for example, a diffusion film, a prism sheet, and a luminance enhanced film used for efficient use of light emitted from a back light and a phase difference film used for compensation of a phase difference of a liquid crystal cell and a polarization plate; however, the other functional members are not limited to them.

EXAMPLE (Hard Coat Layer Forming Coating Liquid 1)

10 parts by mass of Light Ester DQ-100 (produced by Kyoei Chemical Co., Ltd.) containing a quaternary ammonium cation, 25 parts by mass of dipentaerythritol triacrylate, 25 parts by mass of pentaerythritol tetraacrylate, 50 parts by mass of urethane acrylate, 2 parts by mass of IRGACURE 184 ((photoinitiator) manufactured by Ciba Specialty Chemicals Inc.), and 0.2 parts by mass of fluorine-based leveling agent BYK-340 (manufactured by BYK Japan KK) were used to be dissolved in methyl ethyl ketone, and, thus, to prepare a hard coat layer forming coating liquid 1.

(Hard Coat Layer Forming Coating Liquid 2)

10 parts by mass of Light Ester DQ-100 (produced by Kyoei Chemical Co., Ltd.) containing a quaternary ammonium cation, 25 parts by mass of dipentaerythritol triacrylate, 25 parts by mass of pentaerythritol tetraacrylate, 50 parts by mass of urethane acrylate, 5 parts by mass of IRGACURE 184 ((photoinitiator) manufactured by Ciba Specialty Chemicals Inc.), and 0.5 parts by mass of fluorine-based leveling agent BYK-340 (manufactured by BYK Japan KK) were used to be dissolved in methyl ethyl ketone, and, thus, to prepare a hard coat layer forming coating liquid 2.

(Hard Coat Layer Forming Coating Liquid 3)

10 parts by mass of Light Ester DQ-100 (produced by Kyoei Chemical Co., Ltd.) containing a quaternary ammonium cation, 25 parts by mass of dipentaerythritol triacrylate, 25 parts by mass of pentaerythritol tetraacrylate, 50 parts by mass of urethane acrylate, 20 parts by mass of IRGACURE 184 ((photoinitiator) manufactured by Ciba Specialty Chemicals Inc.), and 0.5 parts by mass of fluorine-based leveling agent BYK-340 (manufactured by BYK Japan KK) were used to be dissolved in methyl ethyl ketone, and, thus, to prepare a hard coat layer forming coating liquid 3.

(Hard Coat Layer Forming Coating Liquid 4)

10 parts by mass of Light Ester DQ-100 (produced by Kyoei Chemical Co., Ltd.) containing a quaternary ammonium cation, 25 parts by mass of dipentaerythritol triacrylate, 25 parts by mass of pentaerythritol tetraacrylate, 50 parts by mass of urethane acrylate, and 5 parts by mass of IRGACURE 184 ((photoinitiator) manufactured by Ciba Specialty Chemicals Inc.) were used to be dissolved in methyl ethyl ketone, and, thus, to prepare a hard coat layer forming coating liquid 4.

(Low Refractive Index Layer Forming Coating Liquid)

A dispersion liquid of 14.94 parts by mass of porous silica fine particles (the average particle diameter is 50 nm, the solid content is 20%, and the solvent: methyl isobutyl ketone), 1.99 parts by mass of EO modified dipentaerytritol hexaacrylate (DPEA-12 manufactured by NIPPON KAYAKU Co., Ltd.), 0.07 parts by mass of a photoinitiator (IRGACURE 184 manufactured by Ciba Specialty Chemicals Inc.), and 0.20 parts by mass of TSF4460 (commodity name, alkyl polyether modified silicone oil manufactured by GE Toshiba Silicone Co., Ltd.) were diluted by 82 parts by mass of methyl isobutyl ketone as a solvent to prepare the low refractive index layer forming coating liquid.

Example 1

(Formation of Hard Coat Layer)

The hard coat layer forming coating liquid 1 is coated onto one side of a triacetyl cellulose film (manufactured by Fuji Photo Film Co., Ltd., film thickness: 80 μm) to be dried in an oven at 80° C. for 60 seconds. After drying, ultraviolet rays are applied with an exposure does of 200 mJ/m² under an atmosphere having an oxygen concentration of not more than 0.1 vol %, using an ultraviolet ray irradiation apparatus (light source H bulb manufactured by Fusion UV Systems Japan Co., Ltd.), whereby a transparent hard coat layer having a dried film thickness of 5 μm was formed.

(Formation of Low Refractive Index Layer)

The low refractive index layer forming coating liquid was coated onto the hard coat layer formed by the above method so that the film thickness after drying was 100 nm. The coating film was irradiated with ultraviolet rays with an exposure does of 200 mJ/m², using the ultraviolet ray irradiation apparatus (light source H bulb manufactured by Fusion UV Systems Japan Co., Ltd.) to be cured, and, thus, to form the low refractive index layer, whereby the antireflection film was produced.

Example 2

The antireflection film was obtained in a similar manner to the example 1, except that the hard coat layer forming coating liquid 2 was used instead of the hard coat layer forming coating liquid 1.

Comparative Example 1

The antireflection film was obtained in a similar manner to the example 1, except that the hard coat layer forming coating liquid 3 was used instead of the hard coat layer forming coating liquid 1.

Comparative Example 2

The antireflection film was obtained in a similar manner to the example 1, except that the hard coat layer forming coating liquid 4 was used instead of the hard coat layer forming coating liquid 1.

Comparative Example 3

The antireflection film was obtained in a similar manner to the example 1, except that the hard coat layer forming coating liquid 1 was used and when the hard coat layer was formed, ultraviolet rays were irradiated under an atmosphere having an oxygen concentration of 20 vol %.

The antireflection films obtained in <example 1>, <example 2>, and <comparative examples 1 to 3> were evaluated as follows.

[Measurement of Haze Value]

For the obtained antireflection films, the haze value was measured in conformity with JIS-K7105-1981, using an image clarity meter (NDH-2000 manufactured by Nippon Denshoku Industries Co., Ltd.).

[Average Luminous Reflectance]

For the low refractive index layer surface of the obtained antireflection film, the spectral reflectance at an incident angle of 5° was measured using an automated spectral photometer (U-4000 manufactured by Hitachi Ltd.). The average luminous reflectance was obtained from an obtained spectral reflectance curve. Among the triacetyl cellulose films as transparent base materials, in the measurement, a matte black paint was coated onto a surface formed with no low refractive index layer to perform antireflection treatment.

[Surface Resistance Value]

For the obtained antireflection film, the surface resistance value was measured in conformity with JIS-K6911-1994, using a high resistance resistivity meter (Hiresta MCP-HT260 manufactured by Dia Instruments Co., Ltd.).

[Scratch Resistance]

Steel wool (#0000) was used, the low refractive index layer surface of the antireflection film was rubbed back and forth 10 times with a load of 250 g, and the presence or absence of a flaw was evaluated visually. The antireflection film in which no flaw was confirmed was evaluated as ◯, and the antireflection film in which a flaw was confirmed was evaluated as X.

[Whitening]

Light of a fluorescent lamp was applied to the hard coat layer surface of a film before the low refractive index layer was stacked, and a degree of light diffusion on the hard coat layer surface was evaluated. The antireflection film in which the light diffusion degree is small and the hard coat layer surface was not whitened was evaluated as ○, and the antireflection film in which the hard coat layer surface was whitened was evaluated as X.

[Micro-Indentation Hardness]

For the hard coat layer surface of the obtained film before the low refractive index layer was stacked, the micro-indentation hardness of the hard coat layer surface obtained when the indentation depth was 100 nm was measured using an ultramicro indentation hardness testing machine (NanoIndenter SA2 manufactured by MTS Systems Corporation) (indenter: average leading end radius is 100 nm, a triangular pyramid indenter having a dihedral angle of 80°, push-in speed=2.0 nm/s).

[Center Line Average Height (Ra) of Hard Coat Layer Surface]

For the hard coat layer surface of the obtained film before the low refractive index layer was stacked, the center line average height (Ra) of the hard coat layer surface was measured in conformity with JIS-B0601-1994, using a high-precision fine shape measuring instrument (Surf Corder ET4000A manufactured by Kosaka Laboratory, Ltd.) (cut-off=0.8 mm, evaluation length 2.4 mm, scanning speed=0.2 mm/sec).

[Average Interval (Sm) of Concaves and Convexes of Hard Coat Layer Surface]

For the obtained hard coat film before the low refractive index layer was stacked, the average interval (Sm) of the convexes and concaves of the hard coat layer surface was measured in conformity with JIS-B0601-1994, using the high-precision fine shape measuring instrument (Surf Corder ET4000A manufactured by Kosaka Laboratory, Ltd.) (cut-off=0.8 mm, evaluation length=2.4 mm, scanning speed=0.2 mm/sec).

[Alkali Resistance]

The obtained antireflection film was immersed in a 5.0 N potassium hydroxide aqueous solution, and when the antireflection film after being immersed in the potassium hydroxide aqueous solution was washed with water, a surface state of the antireflection film was visually evaluated. The antireflection film in which a coating film (low refractive index layer) was not peeled was evaluated as ○, and the antireflection film in which the coating film was peeled was evaluated as X.

Regarding the above tests and evaluation, performance evaluation results of the antireflection film are shown in Table 1.

antistatic properties and transparency. In those antireflection films, whitening of the hard coat layer surface was suppressed.

Meanwhile, it was confirmed that the antireflection film of <comparative example 1> had weak scratch resistance. In the antireflection film of <comparative example 2>, the occurrence of the whitening on the surface was confirmed. It was confirmed that the antireflection film of <comparative example 3> had weak scratch resistance and alkali resistance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An antireflection film comprising, stacked in this order:
a transparent base material;
a first layer formed by curing a coating film containing an ionizing radiation curing material, a quaternary ammonium salt material, and a fluorine-based leveling material, the leveling material being in an amount within a range of 0.05 to 5.0 parts by mass based on 100 parts by mass of a total of the ionizing radiation curing material, the quaternary ammonium salt material, and the leveling material; and
a second layer whose refractive index is lower than a refractive index of the first layer,
wherein for a surface of the first layer before formation of the second layer, a micro-indentation hardness obtained when an indentation depth is 100 nm is within a range of 0.45 GPa to 1.0 GPa.

2. The antireflection film according to claim 1, satisfying at least one of requirements: (1) a center line average roughness Ra of a surface of the first layer is within a range of 0.001 μm to 0.010 μm and
(2) an average interval Sm of concaves and convexes of the hard coat layer surface is within a range of 0.15 mm to 1.00 mm.

3. A polarization plate comprising:
the antireflection film according to claim 1;
a polarization layer facing the first layer of the antireflection film while holding the transparent base material of the antireflection film between the polarization layer and the first layer; and

TABLE 1

| | Haze value [%] | Average luminous reflectance [%] | Surface resistance value [Ω/□] | Scratch resistance | Whitening | Micro-indentation hardness [GPa] | Surface roughness of shard coat layer surface | | Alkali resistance |
| | | | | | | | Center line average roughness Ra [μm] | Average interval of concaves and convexes Sm [mm] | |
|---|---|---|---|---|---|---|---|---|---|
| Ex. 1 | 0.2 | 1.0 | $5 \times 10^8$ | ○ | ○ | 0.48 | 0.004 | 0.50 | ○ |
| Ex. 2 | 0.2 | 1.0 | $5 \times 10^8$ | ○ | ○ | 0.52 | 0.003 | 0.61 | ○ |
| Comp. Ex. 1 | 0.2 | 1.0 | $5 \times 10^8$ | X | ○ | 0.50 | 0.004 | 0.47 | ○ |
| Comp. Ex. 2 | 1.5 | 0.8 | $5 \times 10^8$ | X | X | 0.48 | 0.031 | 0.04 | ○ |
| Comp. Ex. 3 | 0.2 | 1.0 | $5 \times 10^8$ | X | ○ | 0.18 | 0.004 | 0.52 | X |

As can be seen from Table 1, the antireflection films of <example 1> and <example 2> had excellent alkali resistance and scratch resistance. Those antireflection films further had a transparent base material facing the antireflection film while holding the polarization layer between the transparent base material and the antireflection film.

4. A method of manufacturing an antireflection film comprising a transparent base material, a first layer, and a second layer whose refractive index is lower than the refractive index of the first layer stacked in this order, the method comprising:
- coating a coating liquid containing an ionizing radiation curing material, a quaternary ammonium salt material, and a leveling material onto at least one principal surface of the transparent base material to form a first coating film; and
- irradiating the first coating film with an ultraviolet ray to obtain the first layer as a cured product of the first coating film, the ultraviolet ray being irradiated under an atmosphere having an oxygen concentration of not more than 1 vol %,
- wherein for a surface of the first layer before formation of the second layer, a micro-indentation hardness obtained when an indentation depth is 100 nm is within a range of 0.45 GPa to 1.0 GPa.

* * * * *